May 20, 1924. 1,494,959
B. KRÄMER
EMERGENCY GOVERNOR MECHANISM FOR ELASTIC FLUID TURBINES AND THE LIKE
Filed Nov. 4, 1922
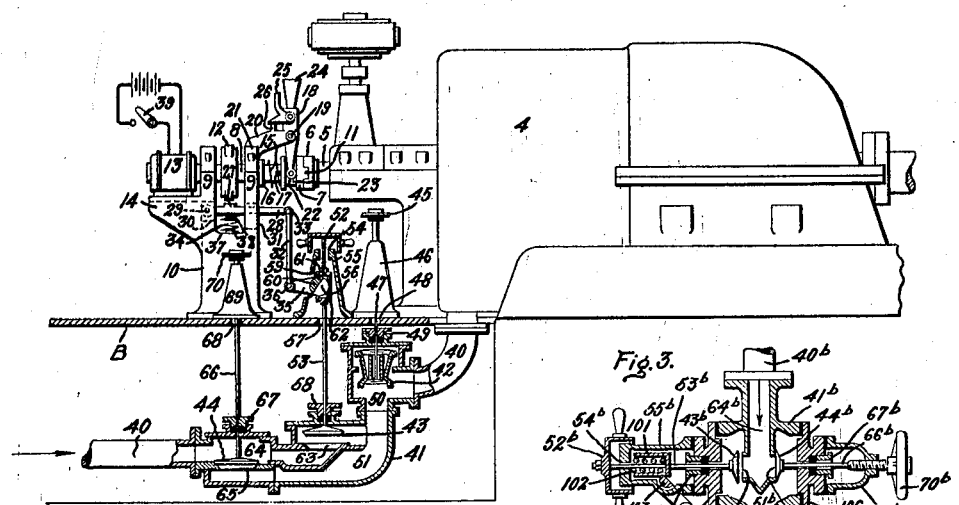
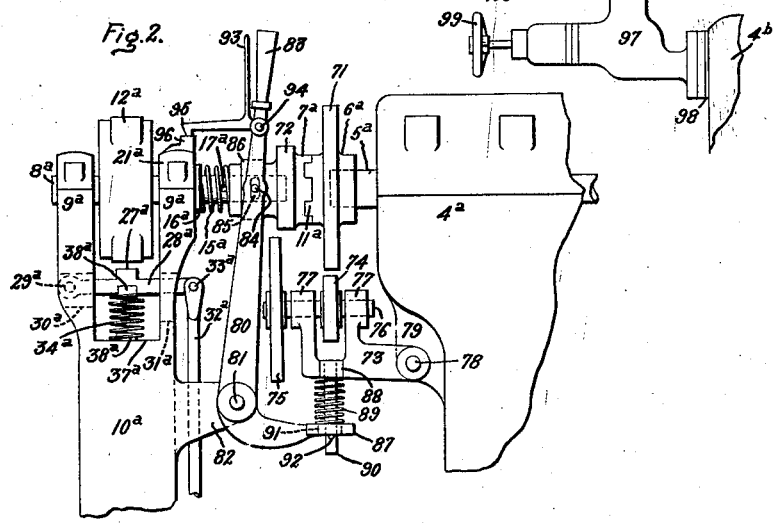
Inventor:
Bernhard Krämer,
by His Attorney Patented May 20, 1924.

1,494,959

UNITED STATES PATENT OFFICE.

BERNHARD KRÄMER, OF CHARLOTTENBURG, GERMANY, ASSIGNOR TO GENERAL ELECTRIC COMPANY, A CORPORATION OF NEW YORK.

EMERGENCY GOVERNOR MECHANISM FOR ELASTIC-FLUID TURBINES AND THE LIKE.

Application filed November 4, 1922. Serial No. 599,139.

*To all whom it may concern:*

Be it known that I, BERNHARD KRÄMER, a citizen of the German Realm, residing in Charlottenburg, Germany, have invented certain new and useful Improvements in Emergency Governor Mechanism for Elastic-Fluid Turbines and the like, of which the following is a specification.

The present invention relates to emergency governor mechanisms, such as are used in connection with elastic-fluid turbines and the like, to shut off the supply of elastic fluid thereto in case a predetermined and allowable abnormal operating speed is reached, and has for its object to provide in a simple structure an improved arrangement of such a mechanism whereby it may be tested for tripping, or adjusted to trip at an allowable abnormal speed, while the machine which it controls is in operation and loaded.

This testing, necessary for reasons of safety, at certain intervals, of emergency governor mechanisms has heretofore been possible only on machines running with light or no load. In plants with heavy loads the condition often exists that loadless operation occurs only at long intervals or not at all, with the result that the necessary tests of the emergency governor mechanisms are omitted or unreliably made, as will be seen after a review of the two most common methods used at present which are briefly as follows: (1) blocking the main governor and overspeeding the machine until the emergency mechanism trips, which subjects the whole machine to stresses above normal; and (2) adding weight to the emergency governor to allow the machine to be tripped near normal speed, which usually necessitates stopping the machine once to add the weight and again to remove it. In both of the above methods, after the valve is tripped, the elastic fluid is cut off until the valve can be opened again which in itself requires dropping the load for a brief time.

More specifically, the object of my invention is to provide an improved structure wherein these disadvantages are remedied and for a consideration of what I believe to be novel and my invention, attention is directed to the accompanying drawing, description and appended claims.

In the drawing, Fig. 1 is a diagrammatic view, partly in section, of a mechanism embodying my invention and applied to an elastic-fluid turbine with its controlling valves below the floor; Fig. 2 is a modification of a portion of Fig. 1; and Fig. 3 is a detail, partly in section, showing the controlling valves mounted above the turbine instead of under the floor as in Fig. 1. It will be understood that the figures are all diagrammatic and used only for purposes of illustration.

Referring particularly to Fig. 1, 4 indicates a prime mover such as an elastic-fluid turbine with its shaft 5 connected solidly to a clutch member 6. The latter engages with a sliding clutch member 7 to releasably connect shaft 5 to an auxiliary shaft 8, mounted in prolongation of shaft 5 in bearings 9 provided on a stand 10 which last may be made part of the turbine base. Clutch members 6 and 7 are each provided with interengaging projections and recesses in their opposing faces as shown at 11, but any other suitable form of clutch members could be used in their place.

Auxiliary shaft 8 carries between its bearings, a suitable emergency governor 12. This emergency governor 12 may be of any approved construction to operate most efficiently with the particular type of prime mover to which my invention may be applied. It must, however, supply a means whereby it will strike a trip finger or anvil when a predetermined speed is reached and it must be capable of adjustment.

In the present instance it may be considered as being the regular elastic-fluid turbine emergency governor consisting of a plunger rod contained in a bored out recess in an enlarged section 12 of the auxiliary shaft 8 and retained therein against centrifugal force by a spring, which latter may be adjusted in compression to give the proper tripping speed. Increased compression of the spring will raise the speed at which the plunger will fly out and strike a trip finger, which latter in the present instance is presented immediately below the emergency governor, as shown in Fig. 1. As this device is old and its operation well understood, further description is believed unnecessary and it will hereinafter be referred to as the emergency governor.

At one end auxiliary shaft 8 carries the armature of an electric motor 13, which motor is mounted on a bracket 14 on stand 10, and at the other end the clutch member 7, before referred to. Clutch member 7 is held in engagement with clutch member 6 by a clutch spring 15 encircling auxiliary shaft 8 and being compressed between said clutch member 7 and a shoulder 16 on the auxiliary shaft 8.

Clutch member 7 drives shaft 8 through a spline and spline-way 17 and is free to slide axially on said shaft into and out of engagement with the clutch member 6. It is for this purpose under control of clutch lever 18 which is pivoted between its ends on a horizontal stud 19 passing at right angles to the axis of the auxiliary shaft 8 through a bracket arm 20 mounted on bearing cap 21.

The clutch lever 18 is provided at its lower end with a roller 22 which fits loosely in the annular groove 23 in the clutch member 7. It is provided at its upper end with a handle 24, whereby throwing said handle to the right, as viewed in the drawing, will move clutch member 7 out of engagement with member 6 against the biasing action of clutch spring 15 and disconnect auxiliary shaft 8 together with emergency governor 12 and electric motor 13 from the turbine shaft 5. A latch 25 on clutch lever 18 holds them thus disconnected by engaging with stud 26 on bracket arm 20.

Below the emergency governor 12 and close enough to it to be struck by the emergency governor thrown out by centrifugal force, when a predetermined speed is reached, is an anvil block 27 carried on the upper side of and between the ends of an emergency governor lever 28. This block is diagrammatically shown integral with it, although it might be a separate piece.

Emergency governor lever 28 is pivoted at one end on a horizontal axis pin 29 provided in a recess 30 in stand 10 and projects out horizontally through a slot 31 in stand 10. It carries a connecting link 32 on a horizontal pivot 33 at its other end. This end is biased upward toward the emergency governor by a return spring 34 compressed against it below anvil block 27 and its travel in this direction is limited by the upper edge of the opening 31 or any suitable adjusting means, to bring the anvil block 27 the proper distance from the emergency governor 12. The lower end of connecting link 32 is connected to the emergency valve trip lever 35 by a horizontal pivot 36.

Return spring 34 is seated on the bottom of a transverse slot 37 provided for it in base 10 and is prevented from skidding out of position by two short studs 38 projecting into it axially, one from the emergency governor lever 28 above and the other from the bottom of the slot 37 below.

In practice this mechanism is preferably totally enclosed, except for handle 24, latch 25 and the pivot end 33 of emergency governor lever 28, but the casing has been omitted from the drawing for the sake of clearness. When testing the emergency governor a switch 39, located at any convenient place, connects electric motor 13 through the circuit indicated to any suitable source of electric power, such as a battery or the station lighting circuit. This switch might in some cases be operated by the clutch lever 18 so that its movement would provide the proper sequence of testing operations.

Below the turbine room floor B is shown an inlet pipe 40 in which is inserted a sectional valve casing 41 containing a throttle valve 42, an emergency, rapid-closing valve 43 and a by-pass valve 44 for said emergency valve, the last being opened only while testing the emergency valve mechanism. This valve casing is mounted near the prime mover for convenient location of controlling hand-wheels and rods. It will be understood that the valves shown are only diagrammatic representations, for the sake of simplicity and clearness, of valves meeting the requirements of the invention.

Throttle valve 42 as shown, represents a balanced, manually-operated main valve such as is regularly employed in conjunction with an elastic-fluid prime-mover and which is provided with an operating hand-wheel 45 above, mounted on a pedestal 46. Connecting valve 42 with hand-wheel 45 is a valve-stem 47, which is screw-threaded through the pedestal 46 and passes down through the floor opening 48 and stuffing box 49. The valve 42 may be thereby screwed downward to cover inlet opening 50 in chamber 51, cutting off the elastic-fluid supply, or upward and open to the position shown in the diagram. As this valve is regularly part of the prime mover and not part of the invention, further description is believed unnecessary.

Emergency, rapid-closing valve 43 is diagrammatically shown as a simple, gravity closed, poppet valve, to be opened by lifting the valve head 52 connected with said valve 43 by an operating rod 53 guided in a bearing 54 in pedestal 55. The upper portion of operating rod 53 within the pedestal 55 carries an extended U-shaped catch block 56 and the lower portion of said rod extends through a floor opening 57 and a stuffing box 58 to the emergency valve 43. If desired this valve may be spring closed after the manner shown in Fig. 3 or it may be of any desirable construction to give the same result as the one here described and illustrated.

Emergency valve trip lever 35 projects horizontally, through an opening 59 in the enclosing pedestal 55, from a horizontal shaft 60, like the spoke of a wheel from a hub. This shaft 60 is held in bearings, not shown, in pedestal 55 so that it passes axially between the short sides of the U-shaped catch-block 56. The upper side 61 of said catch block carries the weight of the valve rod 53 and attached parts and rests on top of the shaft 60 to hold the emergency valve 43 open against gravity or other force tending to close it.

When the shaft 60 is rotated counter-clockwise by a downward movement of the trip lever 35, under action of the emergency governor 12, the solid, semicircular section of the shaft 60, will be carried from beneath said upper side 61 of catch-block 56, and a slot 62 will be presented beneath it instead. It will then be free to drop into this slot, carrying with it the emergency valve 43 to the closed position over an opening 63 between an inlet chamber 64 and the main valve chamber 51, thereby cutting off the supply of elastic fluid.

The by-pass valve 44 may be of any suitable structure. In the present instance it is shown as a plain beveled cover similar to valve 43, fitting over an opening 65 leading into main valve chamber 51 from inlet chamber 64. It is connected to a valve-stem 66 which, passing up through a stuffing box 67 and opening 68 in the floor B, is screw-threaded through the pedestal 69 and connected to a suitable hand-wheel 70. The valve may be thereby opened or closed, being similar in operation to main valve 42.

The operation of the arrangement shown in Fig. 1 is as follows:—Assume the prime mover 4 to be in operation under any load condition, valves 42 and 43 being open, clutch members 6 and 7 engaged, by-pass valve 44 closed, all as shown, and the emergency governor 12 revolving at normal speed. Should abnormal speed now occur above the value at which the emergency governor 12 is set to operate, the emergency governor will be thrown outward by centrifugal force to strike anvil 27 whereby emergency governor lever 28 will move downward under the blow, pivoting on axis pin 29 and carrying the connecting link 32 and the outer pivot end 36 of the emergency valve trip lever 35 with it. Shaft 60 will thereby be rotated counter-clockwise, as viewed in the drawing, and instead of the solid part of shaft 60 beneath the upper supporting side 61 of the U-shaped catch block 56 there will be presented the slot 62. Thus unsupported against gravity or other force acting downwardly upon it, emergency valve 43 will drop closed over opening 63 thereby cutting off the elastic-fluid supply and preventing the prime mover from reaching a dangerously high speed. At the same time the upper side 61 of the catch-block 56 drops into slot 62 in shaft preventing its rotation in either direction and holding the emergency valve trip lever 35 depressed. Consequently through the link 32 and emergency governor lever 28, the anvil block 27 carried by the latter, once it has been struck and depressed, is held out of range of the emergency governor 12 until the abnormal speed subsides.

The main valve 42 is now manually closed and the emergency governor mechanism is reset by lifting the valve head 52. The upper side 61 of the catch block 56 is thereby pulled upward out of the slot 62 and shaft 60 is allowed to rotate, under action of return spring 34 and connecting linkage into position under it. When the upward pull on valve head 52 is then released, the valve 43 is supported once more in the open position as shown, by the upper side 61 of the catch block 56 resting on the solid portion of shaft 60. Emergency governor lever 28 stops against the upper edge of opening 31 in stand 10, bringing the anvil block 27 once more into the proper relation with the emergency governor 12. The prime mover may be here either left shut down or brought up to speed and put into operation again by opening the throttle valve 42 in the usual way. Thus as an emergency governor the present embodiment of my invention functions like any other.

But according to my invention, I place the emergency governor mechanism not only under control of the prime mover for emergency purposes as described above, but also selectively under control of an auxiliary speed increasing device for testing and adjusting purposes.

Thus, in Fig. 1, assume the prime mover 4 again in operation. To test the emergency governor mechanism, the bypass valve 44 is opened by handwheel 70, and by a movement to the right as viewed in the drawing of clutch lever handle 24 the clutch members 6 and 7 are disengaged against the action of clutch spring 15 tending to engage them. Latch 25 drops behind stud 26 and emergency governor 12, on auxiliary shaft 8 is held thus disconnected from the prime mover 4.

Electric motor 13 is then connected to a source of electric power by the control switch 39. This motor is designed to bring the speed of the emergency governor 12 above normal sufficiently to trip it at any limit at which it may be set to operate. When such a limit is reached, anvil block 27 will be struck, and, as before described, emergency valve 43 will be tripped shut over the opening 63 between inlet chamber 64 and main valve chamber 51.

However, as bypass valve 44 is open, the elastic fluid will continue to flow from the inlet chamber 64 into the main valve chamber 51 through opening 65, thus maintaining the operation of the prime mover uninterrupted.

The emergency governor tripping speed may be observed for corrections by a tachometer temporarily or permanently connected to the motor end of the auxiliary shaft 8. This speed is usually between 106 to 108% of normal rated speed of the prime mover, although it may be as high as 115%. If the tripping speed is observed to come outside the required limits, the emergency governor 12 may be brought to rest by stopping the motor 13, and may then be adjusted to the proper setting. Several trials and adjustments may be required, for each of which it is merely necessary to reset the mechanism by pulling up the emergency valve head 52 until it catches and then bring the motor 13 up to speed by closing switch 39.

When the tests or adjustments are completed the speed of motor 13 is brought to approximately that of the prime mover and latch 25 released, allowing the clutch members 6 and 7 to engage under action of spring 15. The emergency governor then being connected to the prime mover for normal operation, the switch 39 is opened and the motor 13 is thus disconnected from the source of electricity.

The emergency valve 43 is now pulled open, thus resetting the mechanism and the bypass valve 44 is closed, the operations being performed in the order given.

Referring now to Fig. 2, a mechanical means for increasing the speed of the emergency governor above normal is shown applied to the arrangement in Fig. 1. Here the electric motor driving means for the auxiliary shaft is replaced by a mechanical driving means combined with the clutch to obtain proper sequence of operations with one lever.

Clutch member 6$^a$ is provided with a friction disk-wheel 71 of relatively large diameter for which it forms a hub and similarly clutch member 7$^a$ is provided with a friction disk-wheel 72 of relatively small diameter.

Clutch member 6$^a$ is rigidly connected to the shaft 5$^a$ of the prime mover 4$^a$ as in Fig. 1. Auxiliary shaft 8$^a$ is in continuation of shaft 5$^a$ and carries emergency governor 12$^a$ between its bearings 9$^a$ in stand 10$^a$ as in Fig. 1. Clutch member 7$^a$ is in driving connection with auxiliary shaft 8$^a$, yet free to slide axially on it by means of the spline and splineway shown at 17$^a$ as it was in Fig. 1, and also it is held in engagement with clutch member 6$^a$ by clutch spring 15$^a$, as in Fig. 1. In fact, all parts shown in this figure having a number with an exponent "a," are substantially the same and for the same purpose as like numbered parts described in connection with and shown in Fig. 1.

A swinging bracket arm 73 below the clutch carries two friction disk-wheels 74 and 75 secured to a shaft 76. This shaft is provided with suitable bearings 77 and is parallel to auxiliary shaft 8$^a$. The bracket arm 73 is pivoted at an end farthest from the bearings 77, to swing in a vertical plane which passes through the axes of shaft 76 and auxiliary shaft 8$^a$. For this purpose a horizontal pivot stud 78 is provided for it in a web 79 on the bearing of the prime mover 4$^a$. This stud 78 is so located that it brings the friction disk-wheels 74 and 75 into proper peripheral relation with their respective cooperating friction disk-wheels 71 and 72. Friction disk-wheel 74 is of relatively less diameter than 71 with which it operates and friction disk-wheel 75 is of relatively greater diameter than 72 with which it operates.

An L-shaped clutch lever 80 is pivoted near the lower end of its vertical portion on a fixed horizontal stud 81, the axis of which passes at right angles to that of auxiliary shaft 8$^a$, and which is secured at one end in a bracket 82 located on stand 10$^a$. At a point in its length between the stud 81 and a handle 83 at its upper end, the clutch lever 80 engages with clutch member 7$^a$ through a pin 84 rigidly secured in said clutch lever and projecting from it into a short slot 85 in a ring 86. This ring in turn, is in free running fit in an annular groove (not shown), corresponding to the groove shown at 23 in Fig. 1.

The horizontal portion of L-shaped clutch lever 80 extends beneath the swinging bracket arm 73 so that a flattened pad 87 at its outer end is presented directly below an extended lug 88 on said bracket arm. Between this lug 88 and the pad 87, a spring 89 is compressed and held in place by encircling a guide rod 90, the upper end of which is secured in the lug 88 and the lower end of which passes loosely through a hole 91 in pad 87. A pin 92 passing through the guide rod 90 below the pad 87 holds spring 89 in slight compression.

A latch 93 horizontally pivoted at 94 to the clutch lever 80 below handle 83, is provided with a hook-shaped end 95 which is arranged to drop into engagement over a stud 96 on bearing cap 21$^a$ when the clutch members 6$^a$ and 7$^a$ are fully disengaged and while the friction disk-wheels 74—71 and 75—72 are still slightly separated before coming into contact.

The operation of the mechanism shown in Fig. 2 is as follows: In normal operation emergency governor 12$^a$ is driven directly through the clutch members 6$^a$ and 7$^a$ and the auxiliary shaft 8$^a$ from the prime mover shaft 5$^a$. If abnormal speed occurs the emergency governor 12$^a$ operates when it reaches a predetermined limit and the supply of elastic fluid is cut off as described in connection with Fig. 1.

As shown in Fig. 2, the clutch members 7$^a$ and 6$^a$ are engaged when the clutch lever 80 is in normal position. The spring 89 tends to move the friction disk-wheels 74 and 75 into engagement with those above them, but pin 92 in guide rod 90 holds the wheels separated the proper distance against this action. This distance is such that the wheels will not come into engagement until the clutch has fully disengaged, the latch hook 95 dropped over stud 96 and the clutch lever 80 is further moved a slight distance beyond toward the left. With the latch 95 engaged over stud 96, the emergency governor is disconnected from the prime mover and will come to rest and may be inspected or adjusted during the test.

To test the emergency governor $12^a$ without interrupting the operation of the prime mover $4^a$, the bypass valve 44 in Fig. 1 must be opened as before described. Then by a movement to the left, as viewed in the drawing, of clutch lever handle 83, the clutch members $6^a$ and $7^a$ are disengaged against the action of clutch spring $15^a$. Latch hook 95 drops over stud 96 preventing the clutch members from re-engaging until latch 93 is depressed.

By a further movement to the left of clutch lever handle 83, friction disk-wheel 74 will be raised gradually upward into peripheral contact with its cooperating wheel 71 and at the same time friction disk-wheel 75 will be raised gradually upward into peripheral contact with its cooperating wheel 72. This is accomplished by the pad 87 at the end of the horizontal portion of the L-shaped clutch lever 80, being brought to bear upwardly against the lower end of compression spring 89. This in turn bears at its upper end against the lower face of lug 88 causing bracket arm 73 to pivot about stud 78 and carry friction wheels 74 and 75 upward into contact with 71 and 72 as described above. This contact between the wheels is gradual and cushioned by the spring 89 which is gradually compressed from the time the wheels make contact.

It will thus be seen that with the friction disk-wheels being gradually brought into full contact as described, the auxiliary shaft $8^a$ and the emergency governor $12^a$ will be gradually increased in speed above that of the prime mover shaft $5^a$ by the high-speed friction gear-train thus formed. This increase in speed will depend upon the relative diameters of the friction disk-wheels which are designed to give the correct speed ratio between the auxiliary shaft $8^a$ and the prime mover shaft $5^a$, so that when the friction disk-wheels have reached full engagement, the emergency governor will have passed through its tripping speed.

A tachometer applied to the end of auxiliary shaft $8^a$ will indicate whether this tripping speed is within the required limits, and if not, the clutch lever may be released toward the right under action of clutch spring $15^a$ until the wheels disengage and the hook end 95 stops against the stud 96. In this position as before described the clutch is out of engagement and as auxiliary shaft $8^a$ is neither in direct nor indirect connection with the prime mover shaft $5^a$, it will come to rest and the emergency governor $12^a$ may be adjusted or inspected. Positive disengagement of the friction disk-wheels is obtained under action of clutch spring $15^a$ by the pad 87 bearing down upon the pin 92 in guide rod 90 and transmitting a positive downward pull through said guide rod to the swinging bracket arm 73 which carries the wheels 74 and 75.

When the emergency governor $12^a$ has been adjusted or inspected, the emergency valve which has been tripped closed, is pulled open and the clutch lever handle 83 is again moved gradually to the left bringing the friction wheels gradually into engagement until the emergency governor is put through its tripping speed once more. If this trial is satisfactory the clutch lever is released to the latched position as before and left there only long enough for the speed of the auxiliary shaft to drop to that of the prime mover shaft. The latch 93 is then included in the grasp on the clutch lever handle 83 and the hook end 95 raised off the stud 96 thereby. The clutch member $7^a$ is then allowed to engage with clutch member $6^a$ under action of clutch spring $15^a$ and the emergency governor $12^a$ comes once more under control of the prime mover $4^a$.

The emergency valve 43 is again pulled open and the bypass valve is closed, thus placing the prime mover $4^a$ in normal operation and under control of the emergency valve mechanism.

Fig. 3 is a diagrammatic representation of the controlling valves for a prime mover having an elastic fluid inlet on top. It further shows in section a compact arrangement of the emergency valve and bypass valve in the same chamber, whereby a saving of space is effected and a neat appearance obtained in keeping with the prime mover itself, with which these valves appear more closely associated in this position.

$4^b$ is the prime mover with a regular main valve 97 adapted to this particular mounting and fitted to its inlet at 98. This main valve is similar to that shown at 42 in Fig. 1 and is manually opened or closed by a hand wheel 99. Valve casing $41^b$ is mounted above main valve 97 and contains the inlet chamber $64^b$ and the main valve chamber $51^b$, the former protruding into the latter. As in Fig. 1 inlet chamber $64^b$ and main valve chamber $51^b$ are connected by two openings $63^b$ and $65^b$. These are covered respectively by emergency valve $43^b$ and bypass valve $44^b$ represented by simple disks. They are shown located opposite each other but could be as well at right angles, although the arrangement shown presents a more symmetrical appearance.

Bearing pedestal 55$^b$ is modified to be mounted directly on valve chamber cover plate 100 and it guides the valve operating 53$^b$ in a bearing 54$^b$ at its outer end. The valve operating rod 53$^b$ connects the valve head 52$^b$ with the valve 43$^b$ passing through a stuffing box 58$^b$. In this modification of Fig. 1 the emergency valve is shown as being spring closed and for this purpose a spring cup 101 is secured concentrically to the valve rod 53$^b$ within the pedestal 55$^b$ to contain a compression spring 102. This spring 102 encircling the valve rod 53$^b$ bears at its inner end against the bottom of said cup and at its outer end against the end wall of the pedestal 55$^b$ thus biasing the emergency valve 43$^b$ toward a closed position over opening 63$^b$.

The emergency valve 43$^b$ is held open in an operating position against the spring action tending to close it by a half-moon catch 103 axially pivoted in bearings, not shown, in pedestal 55$^b$ to swing into and out of engagement with a notch in the side wall of the spring cup 101. This catch is connected with an emergency valve trip lever 104, which is turn is connected through an intermediary of a link 105 to an emergency governor lever corresponding to the emergency governor lever 28 of Fig. 1. The arrangement is such that when the emergency governor operates, the half-moon catch 103 will be rotated counter-clockwise about its axis and leave the notch in spring cup 101, thereby allowing emergency valve 43$^b$ to be closed by valve spring 102. This valve is opened and reset by pulling out to the left, as viewed in the figure, on the valve head 52$^b$ until the half moon catch 103 rotates into the notch as shown.

The bypass valve 44$^b$ is carried on the end of valve stem 66$^b$ which passes through the stuffing box 67$^b$ in valve chamber cover plate 106. The outer end of this valve stem 66$^b$ is enlarged and threaded through the pedestal 69$^b$ and connected to handwheel 70$^b$ by which the valve is screwed open or closed. The pedestal 69$^b$ is adapted to be mounted directly on the valve chamber cover plate 106 as shown.

For normal operation the valves are in the position shown in Fig. 3, main valve 97 being open, bypass valve 44$^b$ being closed and emergency valve 43$^b$ being latched open. The path of the elastic fluid is from the inlet pipe 40$^b$ through the inlet chamber 64$^b$ thence through the opening 63$^b$ into main valve chamber 51$^b$. From there it passes through main valve 97 into the prime mover 4$^b$ where the usual governing or throttling valves control admission to the pistons or buckets. When testing the emergency governor, as described in connection with Figs. 1 and 2, the bypass valve 44$^b$ is opened giving the elastic fluid the auxiliary path through opening 65$^b$, thus maintaining the flow of elastic fluid uninterrupted by the closing of emergency valve 43$^b$. As the operation and use of the valves shown in this modification is the same and for the same purpose as explained in connection with Fig. 1, further detailed description is believed unnecessary.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States is:

1. In combination, an elastic-fluid prime-mover, an emergency governor mechanism therefor, and means for testing the operation of said emergency governor mechanism independently of the speed of operation of the elastic-fluid prime-mover.

2. In combination, an elastic-fluid prime-mover, an emergency governor mechanism therefor, means for testing the operation of said emergency governor mechanism, and means for supplying elastic-fluid to the prime-mover during said testing.

3. In combination, an elastic-fluid prime-mover, an emergency governor mechanism therefor, means for operatively isolating the emergency governor mechanism from control of the prime mover, and means for testing the operation of the emergency governor mechanism when so isolated.

4. In an emergency governor mechanism for a prime-mover, an auxiliary shaft for the emergency governor, means for driving said auxiliary shaft at a certain speed from the prime mover for normal operation, and alternative means for driving the auxiliary shaft at a certain higher speed for testing the emergency governor.

5. In an emergency governor mechanism for a prime-mover, an auxiliary shaft for the emergency governor, means for driving said auxiliary shaft from the prime-mover directly for normal operation, and alternative means for driving the auxiliary shaft from the prime-mover indirectly whereby its speed will be increased above that of the prime-mover for testing the operation of the emergency governor.

6. In combination with an elastic-fluid prime-mover, an emergency governor mechanism, comprising an emergency governor, an auxiliary shaft carrying said emergency governor, a clutch arrangement for releasably connecting the auxiliary shaft with that of the prime-mover, a driving means for said auxiliary shaft whereby to test the operation of the emergency governor its speed may be increased above that of the prime-mover, an emergency valve controlled by the emergency governor, and a bypass valve for said emergency valve whereby the flow of elastic-fluid to the prime-mover may be maintained when the emergency valve is tripped closed by a test operation of the emergency governor.

7. In combination with an elastic fluid prime-mover, an emergency governor mechanism, comprising an emergency governor, an auxiliary shaft to carry said emergency governor, a clutch arrangement for releasably connecting the auxiliary shaft with that of the prime-mover, a speed increasing gearing to releasably connect the auxiliary shaft with that of the prime-mover, an emergency valve controlled by the emergency governor, and a bypass valve for said emergency valve whereby the flow of elastic fluid to the prime-mover may be maintained when the emergency valve is tripped closed by a test operation of the emergency governor.

8. The combination with an elastic-fluid prime-mover, of an emergency governor mechanism comprising an emergency governor, an auxiliary shaft carrying said emergency governor, a clutch arrangement for releasably connecting the auxiliary shaft with that of the prime-mover, means for increasing the speed of the emergency governor above that of the prime-mover, an emergency valve controlled by the emergency governor, a supply conduit for the elastic fluid in which conduit the emergency valve is located, a bypass conduit for said emergency valve, a valve controlling said bypass conduit whereby when said last-named valve is open, the emergency valve may be closed by a test operation of the emergency governor without cutting off the elastic fluid supply to the prime-mover.

9. In an emergency governor mechanism for an elastic-fluid prime mover, an emergency valve interposed between the elastic fluid supply and the prime-mover, and a bypass valve interposed between the elastic fluid supply and the prime mover, the arrangement being such that the closing of both of said valves is required to cut off the flow of elastic fluid.

10. In an emergency governor mechanism for an elastic-fluid prime-mover, an emergency valve controlling an inlet conduit for the elastic fluid, and a bypass valve controlling said inlet conduit, the arrangement being such that the opening of the one valve removes from the other valve the control of said inlet conduit.

11. The combination with an elastic-fluid prime-mover, of an emergency governor mechanism comprising an emergency governor, an emergency valve connected therewith, a supply conduit for the elastic fluid in which conduit the emergency valve is located, a bypass conduit for said emergency valve, and a valve controlling said bypass conduit, whereby when said last-named valve is opened the emergency valve may be closed without affecting the elastic fluid supply to the prime-mover.

12. In an emergency governor mechanism for a prime-mover, a valve casing adapted to be mounted between the main valve of the prime-mover and a supply pipe, said casing being connected with said main valve, a supply chamber connected with said supply pipe extending into said valve casing, an emergency trip valve located in said valve casing, a bypass valve located in said valve casing, each of said valves being arranged to close over an opening in the supply chamber, whereby a compact arrangement of said valves is obtained for mounting adjacent the prime-mover and in connection with the emergency governor.

In witness whereof, I have hereunto set my hand this 28th day of September, 1922.

BERNHARD KRÄMER.